(12) United States Patent
Giordan et al.

(10) Patent No.: US 10,138,754 B2
(45) Date of Patent: Nov. 27, 2018

(54) DEVICE FOR MEASURING AERODYNAMIC MAGNITUDES INTENDED TO BE PLACED IN A FLOW PASSAGE OF A TURBINE ENGINE

(71) Applicant: Safran Aircraft Engines, Paris (FR)

(72) Inventors: Jeremy Giordan, Moissy-Cramayel (FR); Bernard Joseph Florian Kockenpo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/348,824

(22) Filed: Nov. 10, 2016

(65) Prior Publication Data

US 2017/0138216 A1    May 18, 2017

(30) Foreign Application Priority Data

Nov. 12, 2015 (FR) ..................................... 15 60803

(51) Int. Cl.
*F01D 21/00* (2006.01)
*G01D 11/24* (2006.01)
(Continued)

(52) U.S. Cl.
CPC ............. *F01D 21/003* (2013.01); *F01D 5/14* (2013.01); *G01D 11/245* (2013.01); *G01F 1/46* (2013.01);
(Continued)

(58) Field of Classification Search
CPC ...... F01D 21/003; F01D 5/14; F05D 2260/83; F05D 2220/30; F05D 2270/80;
(Continued)

(56) References Cited

U.S. PATENT DOCUMENTS

| 4,108,573 A | 8/1978 | Wagner |
| 4,244,222 A * | 1/1981 | Hoyer .................... F01D 17/02 136/230 |

(Continued)

FOREIGN PATENT DOCUMENTS

| EP | 1835129 A2 | 9/2007 |
| FR | 2465067 A1 | 3/1981 |

(Continued)

OTHER PUBLICATIONS

Search Report in European Application No. 16 19 8037 dated Mar. 15, 2017, with English translation coversheet.

(Continued)

*Primary Examiner* — Freddie Kirkland, III
(74) *Attorney, Agent, or Firm* — Womble Bond Dickinson (US) LLP (57) ABSTRACT

The present invention relates to a device for measuring aerodynamic magnitudes (1) intended to be placed transversally in a flow passage (12, 13) of a turbine engine comprising:
- an upstream body (2) having a profile of general cylindrical shape defining a leading edge (5)
- a plurality of sensors (4), the instrumentation lines (45) of the sensors being placed in the body (2), the sensitive elements (41) of the sensors extending at the leading edge (5);
- a downstream fairing (3) mounted on the upstream body (2) and defining a trailing edge (6);
- the downstream fairing (3) comprising, in the longitudinal direction of the upstream body (2), several sections (35) fixed independently of each other to the body (2), two successive sections (35) being connected by a flexible junction (37).

11 Claims, 6 Drawing Sheets

(51) Int. Cl.
*G01M 15/14* (2006.01)
*F01D 5/14* (2006.01)
*G01L 15/00* (2006.01)
*G01L 19/14* (2006.01)
*G01P 5/165* (2006.01)
*G01M 9/06* (2006.01)
*G01F 1/46* (2006.01)
*G01P 5/10* (2006.01)
*G01P 5/14* (2006.01)

(52) U.S. Cl.
CPC ............ *G01L 15/00* (2013.01); *G01L 19/149* (2013.01); *G01M 9/065* (2013.01); *G01M 15/14* (2013.01); *G01P 5/10* (2013.01); *G01P 5/14* (2013.01); *G01P 5/165* (2013.01); *F05D 2220/30* (2013.01); *F05D 2260/83* (2013.01); *F05D 2270/80* (2013.01)

(58) Field of Classification Search
CPC .. G01F 1/46; G01F 1/68; G01F 1/684; G01M 15/14; G01M 9/065; G01D 11/245; G01L 15/00; G01L 19/149; G01P 5/10; G01P 5/14
See application file for complete search history.

(56) References Cited

U.S. PATENT DOCUMENTS

| 5,753,825 | A | * | 5/1998 | Brandt, Jr. | ............... G01F 1/36 73/861.66 |
| 8,397,565 | B1 | | 3/2013 | Dillon et al. | |
| 9,856,743 | B2 | * | 1/2018 | Kockenpo | ............... F01D 17/08 |
| 2007/0231153 | A1 | * | 10/2007 | Beckford | ............... B21D 53/78 416/229 R |

FOREIGN PATENT DOCUMENTS

FR 3019209 A1 10/2015
GB 2041104 A 9/1980

OTHER PUBLICATIONS

Search Report in French Application No. 1560803 dated Aug. 11, 2016, with English translation coversheet.

* cited by examiner

DEVICE FOR MEASURING AERODYNAMIC MAGNITUDES INTENDED TO BE PLACED IN A FLOW PASSAGE OF A TURBINE ENGINE

FIELD OF THE INVENTION

The present invention relates to the general field of devices for measuring aerodynamic magnitudes, and especially pressure and temperature, in a flow passage of a turbine engine.

STATE OF THE ART

Figure 1:
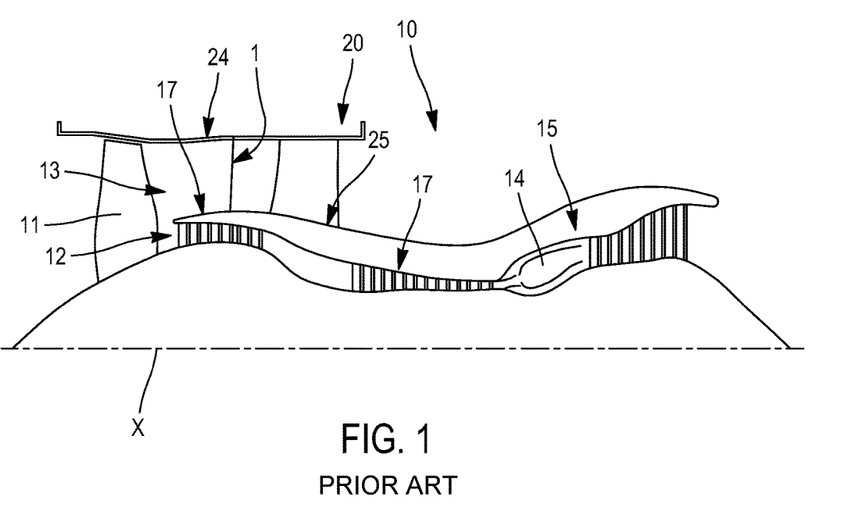
FIG. 1, discussed earlier, is a simplified diagram of a turbine engine on which the flow passage of the steam is located.

FIG. 1 schematically illustrates a turbine engine 10 of bypass and two-spool type to which the invention applies in particular. Clearly, the invention is not limited to this particular type of turbojet and applies to other turbojet architectures and especially to bypass and two-spool turbojets.

The turbine engine 10 comprises, from upstream to downstream in the direction of the flow of gas, a fan 11, one or more compressor stages 17, a combustion chamber 14, one or more turbine stages 15 and an exhaust nozzle for gas.

The turbojet also comprises an intermediate casing 20 having, as is known per se, a structural function (as forces are transmitted through it). In particular, the fastening means of the turbojet to the structure of the airplane in the front part are secured to the intermediate casing. The intermediate casing 20 comprises a hub 25, an outer annular shroud 24 arranged around the hub concentrically to the latter.

The turbojet comprises two coaxial flow passages for gas streams, namely a flow passage for the primary stream (or hot stream) 12, and a flow passage for the secondary stream (or cold stream) 13.

In terms of assays conducted on a turbine engine, it is sometimes necessary to take measurements of aerodynamic magnitudes, especially pressure and temperature, of the gas stream flowing in the flow passages 12 or 13 of a turbine engine.

Figure 2:
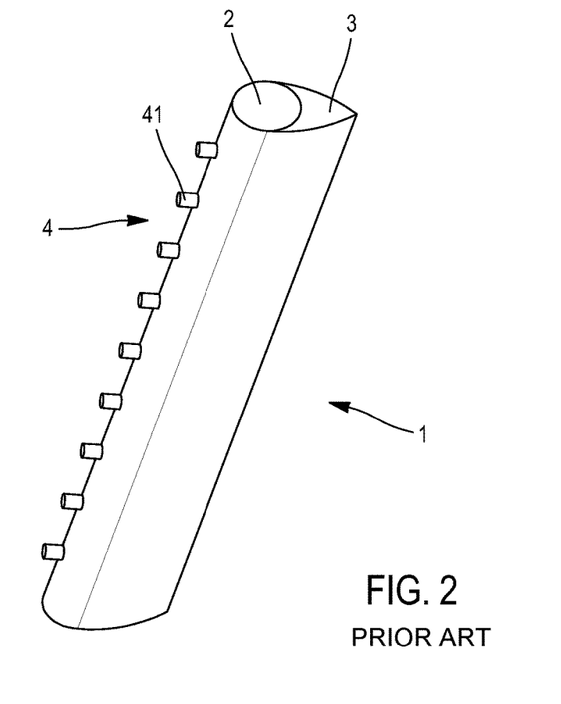
FIG. 2, discussed earlier, illustrates a device for measuring aerodynamic magnitudes according to the prior art.

In reference to FIGS. 1 and 2, it is known to take the measurement of these aerodynamic magnitudes by way of a device for measuring aerodynamic magnitudes 1, placed substantially radially in a flow passage 13 or 12 of a turbine engine, comprising a cylindrical body 2 and a plurality of sensors 4 of aerodynamic magnitude placed in the cylindrical body 2, the sensitive elements 41 of the sensors extending outside the cylindrical body 2 at a leading edge 5. This measuring device 1 generally is named combs, probes or rakes.

Aerodynamic losses created by the presence of the measuring device 1 in the flow passage 12 or 13 perturb this flow when it enters the turbine engine, the consequence being disruption to the operation of the turbine engine 10 and consequently falsification of measurements of aerodynamic magnitudes taken. To limit drag on the measuring device 1 in the flow passage 12 or 13, it is known to adapt fairing 3 attached to the body 2 so as to close its trailing edge sufficiently far downstream to avoid detachment of the stream downstream (FIG. 2).

The measuring device 1 in the flow passage 12 or 13 undergoes strong vibratory stresses.

A first vibratory source is for example consecutive of the residual imbalance of assemblies in rotation, i.e., low-pressure and high-pressure rotors. The origin of a second vibratory source is the alternating of compression and depression phases due to rotation of a row of moving blades. This second vibratory source proves particularly significant when the measuring element is arranged immediately downstream from an impeller.

By way of example, a blower impeller, comprising 30 blades, turning at a speed of rotation of 2000 rpm creates vibration at a frequency of 1000 Hz. If the first specific mode of the measuring element is close to 1000 Hz, the element has a high risk to resonate.

A measuring device 1 has specific frequencies which are fixed and which are a function of its structural and dimensional characteristics. When the vibration frequency of the device 1 is close to its resonance frequency of rank 1 or its specific harmonic frequencies for example that of rank 2, the risk of resonance of the device becomes high.

The resonance phenomena of the measuring device 1 are likely to engender fissures in the measuring device 1 which can impact its mechanical integrity. In extreme cases, the formation of cracks or fissures consecutive to vibrations can lead to partial or total dislocation of the device. The debris now released circulates in the passage and can damage parts of the turbine engine arranged downstream. It is understood that damages caused by such dislocation can be particularly significant when the measuring device is mounted in the primary passage 12 since the debris can damage the combustion chamber and the fixed and rotary parts of the high-pressure and low-pressure turbines.

DISCLOSURE OF THE INVENTION

An aim of the invention is to propose a device for measuring aerodynamic magnitudes having better mechanical strength when placed in a flow passage of a turbine engine.

This aim is achieved in terms of the present invention by a device for measuring aerodynamic magnitudes intended to be placed transversally in a flow passage of a turbine engine comprising:
  an upstream body having a profile of general cylindrical shape defining a leading edge;
  a plurality of sensors including instrumentation lines and sensitive elements, the instrumentation lines of the sensors being placed in the body, the sensitive elements of the sensors extending at the leading edge;
  a downstream fairing mounted on the upstream body and defining a trailing edge;
  the device for measuring aerodynamic magnitude being characterized in that said downstream fairing comprises, in the longitudinal direction of the upstream body bearing the sensors, several sections of downstream fairing fixed independently of each other to the body, two successive sections being connected by a junction which in the longitudinal direction of the upstream body is more flexible than the sections.

The fact that the downstream fairing is split transversally into several sections, each fixed independently to the upstream body, and linked together by a flexible junction, minimizes the vibratory response of the assembly formed by the device, when the latter undergoes vibratory stresses of the stream of the flow passage, and consequently improves the mechanical strength of the measuring device in the flow passage.

In fact, the flexible junction introduces stiffness rupture in the structure of the measuring device, reducing the vibratory response of the device when positioned in the flow passage.

Also, the position of the flexible junction in the longitudinal direction plays on the stiffness of the device and therefore on the resonance frequency of the latter, whether this is the frequency of rank 1 and/or its harmonics. The position of the flexible junction will be chosen such that the resonance frequency of the device does not coincide with the frequencies of vibrations in the flow passage.

The invention is advantageously completed by the following characteristics, taken individually or in any of their technically possible combinations.

The downstream fairing is formed of two sections.

The sections have, in the longitudinal direction of the upstream body, a Young's modulus of over 50 GPa.

The flexible junction has, in the longitudinal direction of the upstream body, a Young's modulus of less than 1 GPa.

The flexible junction is made of elastomer.

The sections are made of metal. The metal has less roughness than the overmolded elastomers, which limits perturbation caused by the device on the stream downstream.

The downstream fairing is fixed to the upstream body by shrinking.

The downstream fairing is fixed to the upstream body by means of pins. The pins constitute the single link points between the upstream body and the downstream fairing. Their position and their number play on the free cantilevered length and the cantilevered mass of the device and therefore on the resonance frequencies of the latter. The terminology "specific frequency" here includes the specific frequency of rank 1 and/or its harmonics.

The invention also relates to a method for determining the position of the flexible junction, or if needed flexible junctions, in the longitudinal direction of a device for measuring aerodynamic magnitudes intended to be placed in a flow passage of a turbine engine, characterized in that it comprises steps of:
    determining the vibratory frequencies in the flow passage;
    determining the position of the flexible junction in the longitudinal direction of the upstream body, such that at least one specific frequency, and preferably at least the specific frequency of the first order, and preferably all the specific frequencies, of the device for measuring aerodynamic magnitudes does not coincide with the vibratory frequencies in the flow passage.

The invention also relates to a method for determining the position of the flexible junction, or if needed flexible junctions, and/or the number and/or the position of the pins in a device for measuring aerodynamic magnitudes, characterized in that it comprises steps of:
    determining the vibratory frequencies in the flow passage;
    determining the position of the flexible junction, and/or the number and/or the position of the pins such that at least one specific frequency, and preferably at least the specific frequency of the first order, and preferably all the specific frequencies, of the device for measuring aerodynamic magnitudes does not coincide with the vibratory frequencies in the flow passage.

The invention also relates to a test method of a turbine engine, characterized in that it comprises a step during which a device for measuring aerodynamic magnitudes is placed in a flow passage of the turbine engine.

DESCRIPTION OF THE FIGURES

Other aims, characteristics and advantages will emerge from the following detailed description in reference to the drawings given by way of illustration and non-limiting, in which.

DETAILED DESCRIPTION OF THE INVENTION

In reference to FIG. 1, the device for measuring aerodynamic magnitudes 1 is intended to be placed substantially transversally in the primary stream flow passage 12, or in the secondary stream flow passage 13.

Figure 3:
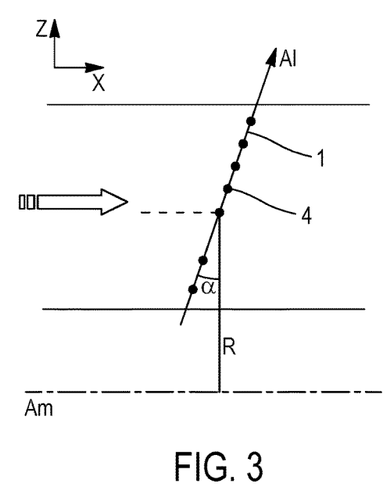
FIGS. 3 and 4 illustrate a device for measuring aerodynamic magnitudes disposed in a flow passage, FIG. 3 being a view perpendicular to the plane containing the longitudinal axis of the device and the engine axis, and FIG. 4 a view along the longitudinal axis of the device.
Figure 4:
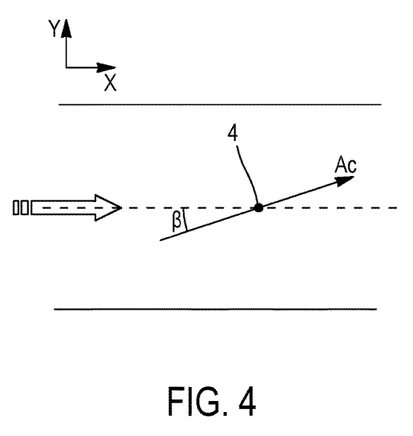

In reference to FIGS. 3 and 4, the measurements are characterized by immersion of the device 1 in the passage, characterized by the distance R from the sensor to the axis of the engine Am, the angle of incidence α of the stream on the device 1 which is the angle between the axis of the engine Am and the longitudinal direction Al of the device 1 and the sideslip angle β which is the angle between the axis of the engine Am and the direction Ac in which the downstream fairing 3 extends.

Figure 5:
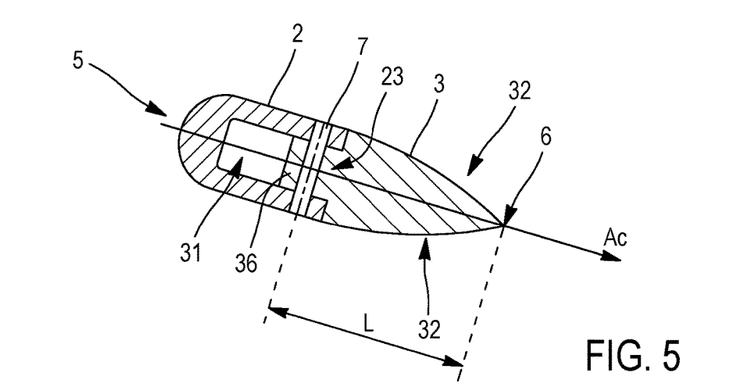
FIG. 5 is a view in transversal section of a device for measuring aerodynamic magnitudes according to the invention.
Figure 6:
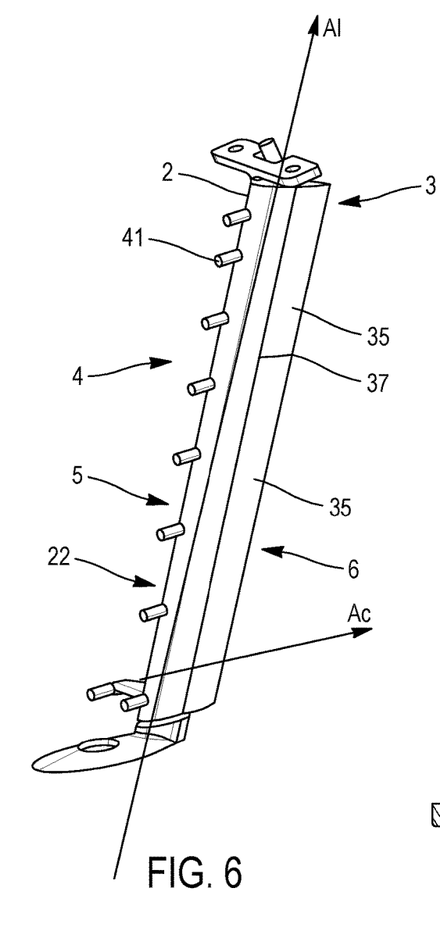
FIG. 6 is a perspective view showing the side of a device for measuring aerodynamic magnitudes according to the invention.
Figure 7:
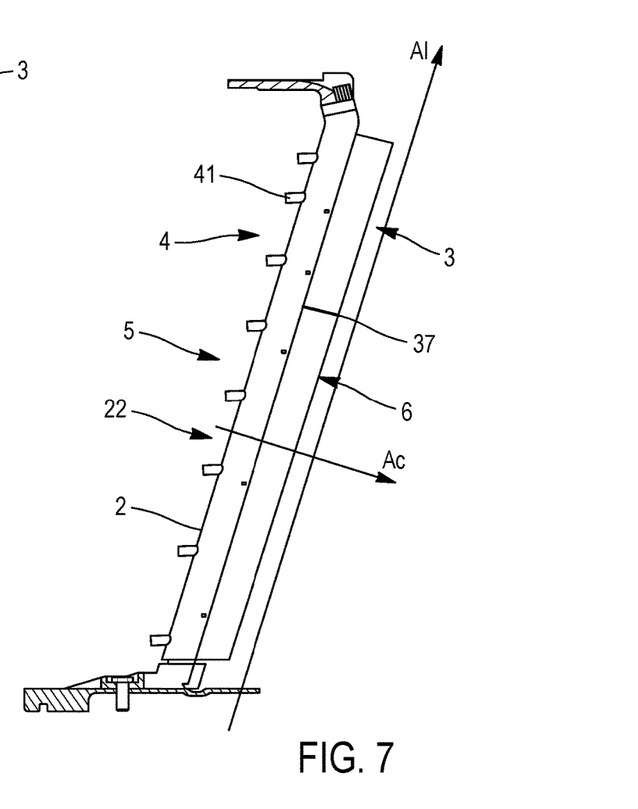
FIG. 7 is a view partially in longitudinal section of a device for measuring aerodynamic magnitudes according to the invention.

In reference to FIGS. 5 to 7, the device for measuring aerodynamic magnitudes 1 comprises a hollow upstream body 2, a plurality of aerodynamic magnitude sensors 4 placed in the upstream body 2, and a downstream fairing 3.

Upstream Body 2

The upstream body 2 has a profile of general cylindrical shape.

The surface of the upstream body 2 is defined by a generator holding a fixed direction which defines the longitudinal direction of the upstream body.

The upstream body 2 is typically a hollow cylinder. In particular, the upstream body 2 can be a cylinder of circular, oval or C-shape cross-section. The upstream body 2 is preferably made of metal or rigid plastic (rigid means having a Young's modulus of over 50 GPa).

Figure 8:
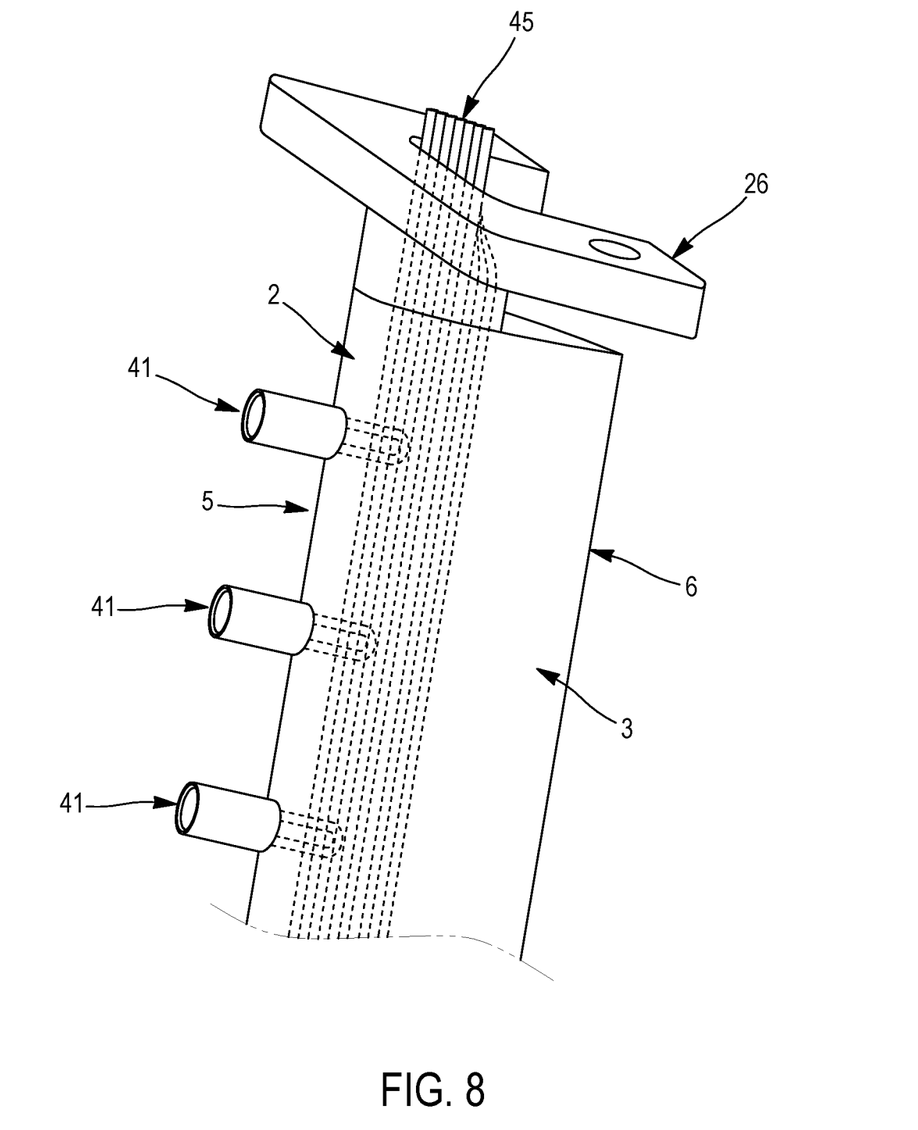
FIG. 8 illustrates the instrumentation wires and the attachment plate of a device for measuring aerodynamic magnitudes according to the invention.

In reference to FIG. 8, the upstream body 2 is fixed substantially radially in the secondary stream flow passage 13 or to the outer annular shroud 24 or to the hub 25, or both to the outer annular shroud 24 and to the hub 25. In particular, the upstream body 2 can be fixed by an attachment plate 27 onto the inner wall of the outer annular shroud 24 as shown in FIG. 8.

Sensors 4

The sensors 4 are pressure and temperature probes.

By way of example, the temperature probes can be of thermocouple sensor type, the sensitive element of the probe being made of two metals of different resistivity joined together so as to generate a difference in potential to be connected to the measured temperature.

Such a temperature probe is well known to those skilled in the art and therefore will not be described in detail here.

By way of example, the pressure probes can especially be instrumentation tubes such as Kiel probes. Such pressure probes are well known to those skilled in the art and therefore will not be described in detail here.

The sensitive elements 41 of the sensors extend outside the upstream body 2 at the leading edge 5.

The sensors 4 are connected to a computer (not shown in the figures) where measured data are processed. The sensors 4 are connected to the computer by instrumentation lines 45 (FIG. 8) which are placed in the cylindrical upstream body 2. The computer is typically located outside the engine.

Downstream Fairing 3

In reference to FIG. 5, the downstream fairing 3 has a longitudinal face 31 adapted to be assembled on the upstream body 2. The downstream fairing 3 has two other longitudinal faces 32 which join in a ridge and constitute the trailing edge 6 when the measuring device is positioned in the flow passage 13.

The face of the upstream body 2 not covered by the downstream fairing and opposite the downstream fairing 3 forms the leading edge 5 when the measuring device 1 is placed in the flow passage 13.

The distance between the attachment point of the downstream fairing 3 on the cylindrical upstream body 2 and the trailing edge 6 is called free cantilevered length L of the device 1. The free cantilevered length L is typically between 2 and 4 cm.

The downstream fairing 3 typically has a general cylindrical shape.

The length of the downstream fairing 3, i.e., its dimension in the longitudinal direction, is typically between 1 cm is 1 m.

In the longitudinal direction of the upstream body 2, the downstream fairing 3 comprises several sections of downstream fairing 35 fixed independently of each other to the body 2.

For this reason, the downstream fairing 3 is split, according to transversal directions, in several sections 35 mounted on the upstream body 2 side by side so as to be aligned with each other in the longitudinal direction of the upstream body.

In particular, the downstream fairing 3 may be formed from two sections 35.

The downstream fairing 3 is preferably metallic. In fact, the metal has less roughness than the overmolded elastomers, which limits perturbation caused by the device 1 on the stream downstream. The downstream fairing 3 can be obtained sized in the mass then split into sections 35.

The sections 35 are each fixed independently to the upstream body 2.

The transversal sections 35 are typically mounted by shrinking on the upstream body 2.

Figure 9A:
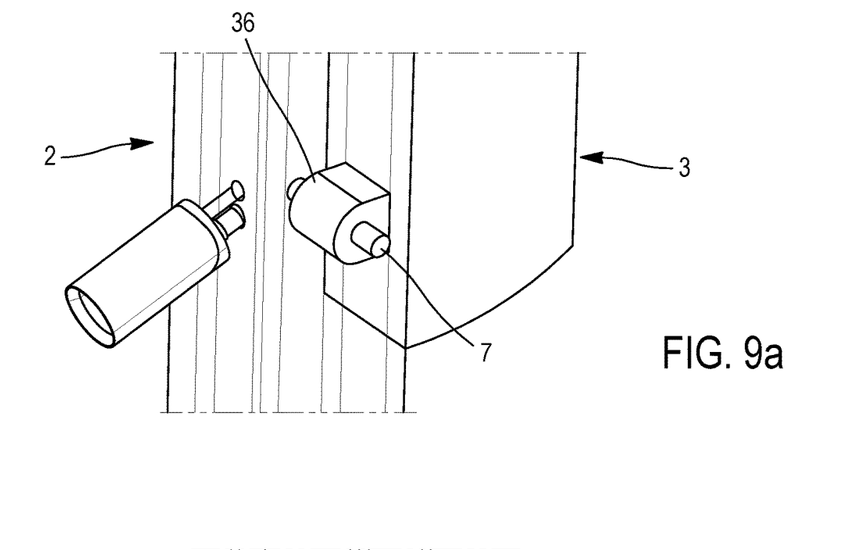
FIG. 9a illustrates a tenon protruding from the downstream fairing inserted into a mortise arranged in the upstream body.
Figure 9B:
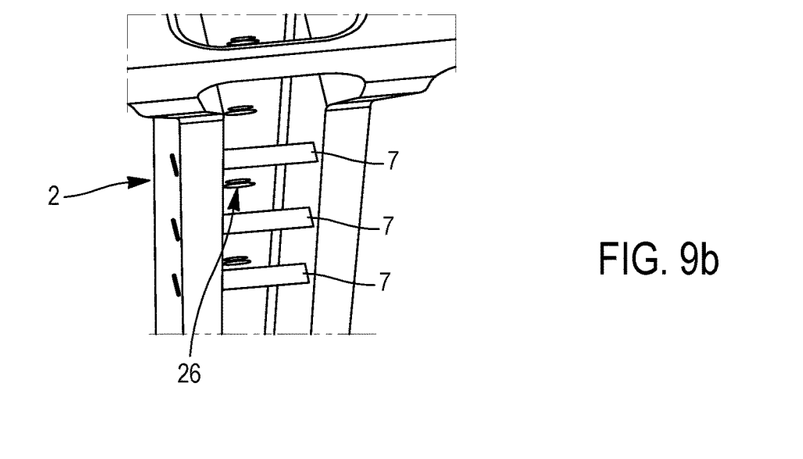
FIG. 9b illustrates a mortise arranged in the upstream body.
Figure 9C:
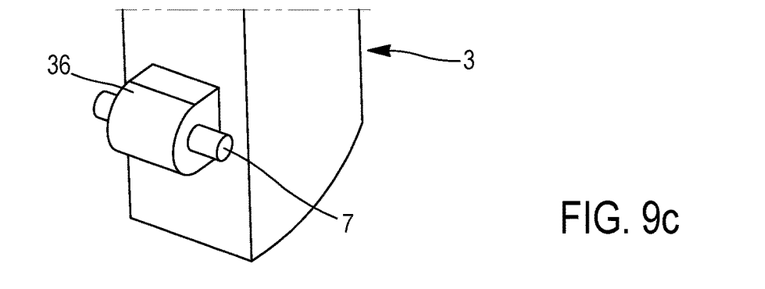
FIG. 9c illustrates a tenon protruding from the downstream fairing.

The longitudinal face 31 of the sections 35 adapted to be assembled on the cylindrical upstream body 2 for this reason has a tenon 36 protruding from the longitudinal face 31 and adapted to be inserted in a corresponding mortise 26 made in the upstream body 2 (as shown in FIG. 9a). As illustrated in FIG. 9b, the mortise 26 is a cavity made in the upstream body 2 to take up the tenon 36 of the sections 35. As illustrated in FIG. 9c, the tenon 36 is a cylindrical protrusion, generally of rectangular cross-section. The mortise 26 is a cylindrical cavity, complementary to the tenon 36 and generally of rectangular cross-section. The tenons 36 rest in a mortise 26 and not assembled by tight fit.

The sections 35 can further be held by pins 7 so as to limit their rotation on the upstream body. The pins 7 are inserted in the upstream body 2 so as to pass through the mortise 26 and the tenon 36 on either side without protruding from the upstream body 2.

The pins 7 are typically cylindrical elements and generally made of metal. They can be splined with longitudinal splines causing swelling of the metal by backflow; when installed, the splines deforms elastically and ensures adherent assembly without clearance.

The pins 7 can also be threaded.

The sections 35 have low, though not zero, elasticity which lets them deform elastically under the effect of aerodynamic stresses when the device 1 is placed in the passage. In the longitudinal direction of the upstream body, the sections 35 have a Young's modulus of typically over 50 GPa, for example 69 GPa for aluminium.

The sections 35 are mounted at a forced displacement relative to each other.

For this purpose two successive sections 35 are connected together by a junction 37 which is more flexible than the sections 35 in the longitudinal direction of the upstream body 2.

More flexible in the longitudinal direction of the upstream body means that the junction 37a has a Young's modulus, in the longitudinal direction of the upstream body, lower than the sections 35. The flexible junction 37 is typically made of elastomer. In the longitudinal direction of the upstream body, the flexible junction 37 typically has a Young's modulus of less than 1 GPa.

The flexible junction 37 extends between the transversal faces of two adjacent sections 35. The flexible junction 37 is preferably fixed to each section 35 over the entire transversal face of the latter to maximize adherence of the flexible junction 37 to the section 35.

The flexible junction 37 is typically made by injection molding. The plastic material is softened by heating then injected between the two sections 35, and then cooled.

The flexible junction 37 can also be made by vulcanization of polymer.

The length of the flexible junction 37 in the longitudinal direction is typically from 1 mm to 3 mm.

The flexible junction 37 introduces stiffness disruption in the structure of the measuring device 1, which reduces the vibratory behavior of the device 1 when positioned in the flow passage.

The fact that the downstream fairing 3 is split into sections 35 linked by a flexible junction 37 enables adaptation of the specific frequencies of the assembly formed by the device 1.

Figure 10:
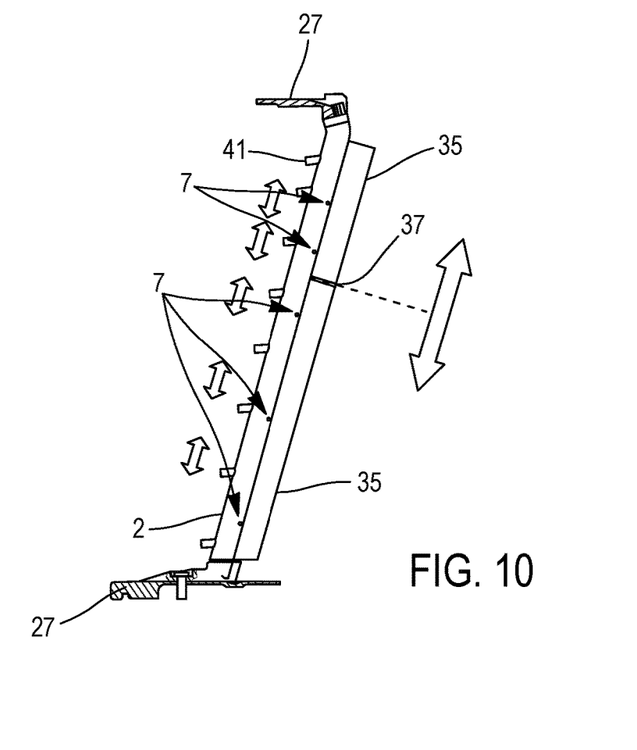
FIG. 10 illustrates the adjustment parameters of a device for measuring aerodynamic magnitudes in accordance with the invention.

In reference to FIG. 10, the location of the flexible junction 37, and/or the number and/or the position of the pins 7 are selected so as to optimize the vibratory behavior of the device 1 when the latter is placed in the flow passage, and this for all possible engine speeds (idling, cruising, etc).

The beam theory gives a canonic expression for the specific frequencies of a mechanical system whereof the morphology is similar to the device 1:

$$f_i = \frac{\alpha_i^2}{2\pi L^2}\sqrt{\frac{K}{M}}$$

with:
- $\alpha_i^2$ coefficient which depends on the order of the mode $i \in \{1, 2, \ldots\}$ and the hooking conditions of the device in the passage;
- L: free cantilevered length of the device 1,
- K: stiffness of the device 1,
- M: cantilevered mass of the device 1, The stiffness coefficient K depends on the positioning of the flexible junction(s) 37 in the longitudinal direction of the upstream body.

Figure 11:
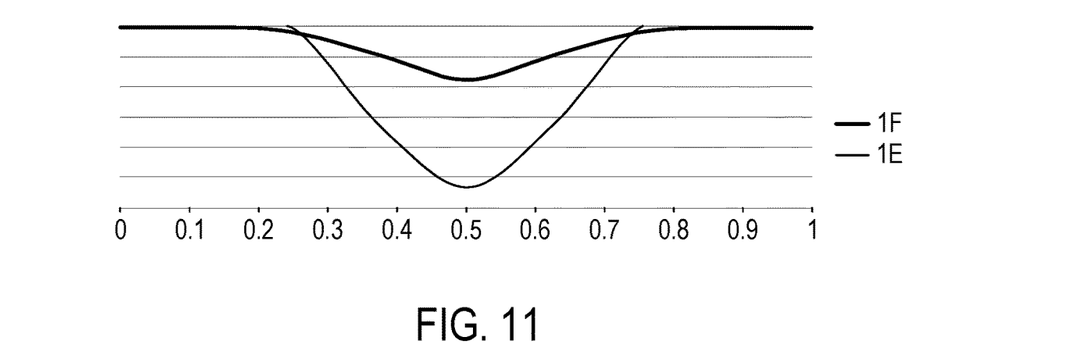
FIG. 11 illustrates in abscissa the distance from the flexible junction to the end of the downstream fairing over the length of the downstream fairing and in ordinates the deduction of the specific frequencies for modes 1F (tangential flexion) and 1E (axial flexion).

As illustrated in FIG. 11, which illustrates the abatement of the specific frequencies for modes 1F (tangential flexion) and 1E (axial flexion), specifically the relationship between the specific frequency of a device without flexible junction and the specific frequency of a device with flexible junction, relative to the position of the flexible junction 37 in the longitudinal direction of the device 1, namely the ratio (distance of a single flexible junction 37 from the end of the downstream fairing 3/length of the downstream fairing), the more the flexible junction 37 is positioned in the middle of the device 1, the more the frequencies of specific modes are low, vice versa, the farther the flexible junction 37 is from the middle of the device 1, the higher the frequencies of the specific modes.

As can be seen in FIG. 11, the abatement of the specific frequencies is particularly significant on the field [0.3; 0.7].

Also, the stiffness coefficient K, the mass M and the free cantilevered length L are dependent on the number and position of the pins 7.

In fact, the pins 7 constitute the single link points between the upstream body 2 and the downstream fairing 3. Their position plays on the free cantilevered length L and the cantilevered mass M. The greater the free cantilevered length L, the lower the specific frequencies and vice versa.

The location of the flexible junction 37, and/or the number and/or the position of the pins 7 are selected such that the specific frequencies of the assembly formed by the device 1 do not coincide with the vibratory frequencies caused by the stream in the flow passage, so as to prevent the assembly formed by the device 1 from returning to resonance when placed in the stream of the flow passage.

It should be noted that the device 1 adapts the specific frequencies of the assembly formed by the device 1 upwards and downwards, while a fully flexible downstream fairing lowers the specific frequencies of the assembly formed by the device. In fact, a gain in stiffness K means a rise in specific frequencies and a gain in mass M means a drop in specific frequencies.

The location of the flexible junction 37, or if needed flexible junctions, and/or of the number and/or of the position of the pins 7 can especially be determined by a method comprising steps of:
- determining the vibratory frequencies in the flow passage 12 or 13;
- determining the location of the flexible junction 37, and/or the number and/or the position of the pins 7 such that at least one specific frequency, and preferably at least the specific frequency of the first order, and preferably all the specific frequencies, of the device for measuring aerodynamic magnitudes 1 do not coincide with the vibratory frequencies in the flow passage 13.

Determining the vibratory frequencies in the flow passage can be done by calculation or experimentally or by any other appropriate method.

The location of the flexible junction 37 and/or of the number and/or of the position of the pins 7 can especially be determined by an iterative method. Starting with a choice of an initial position of the flexible junction 37, and/or of the number and/or of the position of the pins 7 considered as a first draft, a method is followed by iterations during which a succession of approximate refined solutions which gradually minimize the vibratory response of the assembly formed by the device 1 is determined. The location of the flexible junction 37 and/or of the number and/or of the position of the pins 7 is preferably determined by first proceeding with determining the location of the flexible junction 37 by iterations, then by determining the number of pins 7 by iterations, then by determining the position of each pin 7 by iterations.

The invention claimed is:

1. A device for measuring aerodynamic magnitudes intended to be placed transversally in a flow passage of a turbine engine comprising:
   - an upstream body having a profile of general cylindrical shape defining a leading edge
   - a plurality of sensors including instrumentation lines and sensitive elements, the instrumentation lines of the sensors being placed in the body, the sensitive elements of the sensors extending at the leading edge;
   - a downstream fairing mounted on the upstream body and defining a trailing edge;
   - the device for measuring aerodynamic magnitude wherein said downstream fairing comprises, in the longitudinal direction of the upstream body bearing the sensors, several sections of downstream fairing fixed independently of each other to the body, two successive sections being connected by a junction which in the longitudinal direction of the upstream body is more flexible than the sections.

2. The device for measuring aerodynamic magnitudes, according to claim 1, wherein the downstream fairing is formed of two sections.

3. The device for measuring aerodynamic magnitudes, according to claim 1, wherein the sections have, in the longitudinal direction of the upstream body, a Young's modulus of over 50 GPa.

4. The device for measuring aerodynamic magnitudes, according to claim 1, wherein the flexible junction has, in the longitudinal direction of the upstream body, a Young's modulus of less than 1 GPa.

5. The device for measuring aerodynamic magnitudes, according to claim 1, wherein the flexible junction is made of elastomer.

6. The device for measuring aerodynamic magnitudes, according to claim 1, wherein the sections are made of metal.

7. The device for measuring aerodynamic magnitudes, according to claim 1, wherein the downstream fairing is fixed to the upstream body by shrinking.

8. The device for measuring aerodynamic magnitudes, according to claim 1, wherein the downstream fairing is fixed to the upstream body by means of pins.

9. A method for determining the position of at least one flexible junction of a device for measuring aerodynamic magnitudes,
- wherein said device is intended to be placed transversally in a flow passage of a turbine engine and comprises:
- an upstream body having a profile of general cylindrical shape defining a leading edge
- a plurality of sensors including instrumentation lines and sensitive elements, the instrumentation lines of the sensors being placed in the body, the sensitive elements of the sensors extending at the leading edge;
- a downstream fairing mounted on the upstream body and defining a trailing edge;
- wherein said downstream fairing comprises, in the longitudinal direction of the upstream body bearing the sensors, several sections of downstream fairing fixed independently of each other to the body, two successive sections being connected by a junction which in the longitudinal direction of the upstream body is more flexible than the sections,
- wherein it comprises steps of:
- determining the vibratory frequencies in the flow passage;
- determining the position of at least one flexible junction in the longitudinal direction of the upstream body and/or the number and/or the position of the pins, such that at least one specific frequency of the device for measuring aerodynamic magnitudes does not coincide with the vibratory frequencies in the flow passage.

10. A method for testing a turbine engine, comprising placing a device for measuring aerodynamic magnitudes in a flow passage of the turbine engine wherein said device is for placing transversally in the flow passage of the turbine engine and comprises:
- an upstream body having a profile of general cylindrical shape defining a leading edge
- a plurality of sensors including instrumentation lines and sensitive elements, the instrumentation lines of the sensors being placed in the body, the sensitive elements of the sensors extending at the leading edge;
- a downstream fairing mounted on the upstream body and defining a trailing edge;
- wherein said downstream fairing comprises, in the longitudinal direction of the upstream body bearing the sensors, several sections of downstream fairing fixed independently of each other to the body, two successive sections being connected by a junction which in the longitudinal direction of the upstream body is more flexible than the sections.

11. A method for determining the number and/or of the position of the pins in a device for measuring aerodynamic magnitudes,
- wherein said device is intended to be placed transversally in a flow passage of a turbine engine and comprises:
- an upstream body having a profile of general cylindrical shape defining a leading edge;
- a plurality of sensors including instrumentation lines and sensitive elements, the instrumentation lines of the sensors being placed in the body, the sensitive elements of the sensors extending at the leading edge;
- a downstream fairing mounted on the upstream body and defining a trailing edge;
- wherein said downstream fairing comprises, in the longitudinal direction of the upstream body bearing the sensors, several sections of downstream fairing fixed independently of each other to the body, two successive sections being connected by a junction which in the longitudinal direction of the upstream body is more flexible than the sections,
- wherein the downstream fairing is fixed to the upstream body by means of pins of a device for measuring aerodynamic magnitudes,
- wherein said method comprises steps of:
- determining the vibratory frequencies in the flow passage;
- determining the position of at least one flexible junction in the longitudinal direction of the upstream body and/or the number and/or the position of the pins, such that at least one specific frequency of the device for measuring aerodynamic magnitudes does not coincide with the vibratory frequencies in the flow passage.

* * * * *